(12) United States Patent
Kong et al.

(10) Patent No.: US 10,645,039 B2
(45) Date of Patent: May 5, 2020

(54) INFORMATION PROCESSING METHOD AND TERMINAL, AND COMPUTER STORAGE MEDIUM

(71) Applicant: TENCENT TECHNOLOGY (SHENZHEN) COMPANY LIMITED, Shenzhen (CN)

(72) Inventors: Jingjing Kong, Shenzhen (CN); Yong Li, Shenzhen (CN); Yuxing Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 15/619,272

(22) Filed: Jun. 9, 2017

(65) Prior Publication Data
US 2017/0279748 A1 Sep. 28, 2017

Related U.S. Application Data

(63) Continuation of application No. PCT/CN2016/077030, filed on Mar. 22, 2016.

(30) Foreign Application Priority Data

Jun. 24, 2015 (CN) .......................... 2015 1 0355882

(51) Int. Cl.
*H04L 12/58* (2006.01)
*G06F 16/44* (2019.01)
(Continued)

(52) U.S. Cl.
CPC ............ *H04L 51/046* (2013.01); *G06F 16/44* (2019.01); *G06Q 20/3276* (2013.01);
(Continued)

(58) Field of Classification Search
CPC ... H04L 67/16; H04L 2209/34; H04L 63/067; H04L 63/08; H04L 63/0876; H04L 63/10;
(Continued)

(56) References Cited

U.S. PATENT DOCUMENTS 5,159,669 A  10/1992 Trigg
9,384,635 B2 * 7/2016 Nguyen .................. A63F 13/12
(Continued)

FOREIGN PATENT DOCUMENTS

CN  102800000 A  11/2012
CN  103164412 A  6/2013
(Continued)

OTHER PUBLICATIONS

English Translation of the Written Opinion of the International Search Authority in international application No. PCT/CN2016/077030, dated Jun. 7, 2016.
(Continued)

*Primary Examiner* — Chirag R Patel
(74) *Attorney, Agent, or Firm* — Anova Law Group, PLLC

(57) ABSTRACT

An information processing method includes generating identification information according to a preset manner, and displaying identification information on a multimedia interaction interface, identification information being capable of being scanned by clients so that the clients establish an association relationship with a first event presented on multimedia interaction interface; obtaining identifiers of the clients in association relationship with the first event based on results of clients' scanning of identification information, and establishing a first set of identifiers; when a condition is met, receiving requests from M clients, and identifying identifiers of M clients; screening, based on the first set of identifiers, the identifiers of M clients to obtain N client
(Continued)

identifiers matched with any identifier in the first set of identifiers, wherein M and N are both positive integers, and M≥N; and outputting at least one client identifier of N client identifiers according to a preset rule.

17 Claims, 14 Drawing Sheets

(51) Int. Cl.
  *G06Q 20/38* (2012.01)
  *G06Q 20/32* (2012.01)
  *H04L 29/06* (2006.01)
  *H04L 29/08* (2006.01)

(52) U.S. Cl.
  CPC ........... *G06Q 20/388* (2013.01); *H04L 51/10* (2013.01); *H04L 51/14* (2013.01); *H04L 51/28* (2013.01); *H04L 51/32* (2013.01); *H04L 63/10* (2013.01); *H04L 65/1076* (2013.01); *H04L 67/306* (2013.01)

(58) Field of Classification Search
  CPC ..... H04L 63/12; H04L 9/3226; H04L 9/3297; A63F 13/332; G07F 17/3225; G07F 17/3241; G07F 17/3251; G06Q 20/3276; G06Q 20/388
  See application file for complete search history.

(56) References Cited

U.S. PATENT DOCUMENTS

| | | | | |
|---|---|---|---|---|
| 10,395,472 | B1* | 8/2019 | Kerr | .................... G07F 17/3213 |
| 2009/0132352 | A1* | 5/2009 | Kerven | .................. G06Q 30/02 |
| | | | | 705/14.1 |
| 2012/0268611 | A1 | 10/2012 | Kimijima | |
| 2012/0295591 | A1* | 11/2012 | Boudville | ......... H04M 1/72561 |
| | | | | 455/414.1 |
| 2012/0323717 | A1 | 12/2012 | Kirsch | |
| 2013/0151590 | A1 | 6/2013 | Feng | |
| 2014/0245173 | A1 | 8/2014 | Knodt | |
| 2015/0095435 | A1 | 4/2015 | Kasai et al. | |
| 2015/0161244 | A1 | 6/2015 | Guan | |
| 2018/0096324 | A1 | 4/2018 | Chen | |

FOREIGN PATENT DOCUMENTS

| | | | |
|---|---|---|---|
| CN | 103634318 | A | 3/2014 |
| CN | 104091277 | A | 10/2014 |
| CN | 104363471 | A | 2/2015 |
| CN | 104618226 | A | 5/2015 |
| CN | 104660555 | A | 5/2015 |
| CN | 105007214 | A | 10/2015 |
| JP | 2001309440 | A | 11/2001 |
| JP | 2002133024 | A | 5/2002 |
| JP | 2002216030 | A | 8/2002 |
| JP | 2012227814 | A | 11/2012 |
| JP | 2014171221 | A | 9/2014 |
| JP | 2015069472 | A | 4/2015 |
| JP | 2017004053 | A | 1/2017 |
| JP | 2018518771 | A | 7/2018 |

OTHER PUBLICATIONS

English Translation of the Notification of the First Office Action of Japanese application No. 2017-560866, dated Sep. 3, 2018.
International Search Report in international application No. PCT/CN2016/077030, dated Jun. 7, 2016.
Notification of the First Office Action of Chinese application No. 201510355882.8, dated Oct. 10, 2017.

* cited by examiner

INFORMATION PROCESSING METHOD AND TERMINAL, AND COMPUTER STORAGE MEDIUM

CROSS-REFERENCE TO RELATED APPLICATIONS

This is a continuation application of International Patent Application No. PCT/CN2016/077030, filed on Mar. 22, 2016, which claims priority to Chinese Patent Application No. 201510355882.8 filed on Jun. 24, 2015. The disclosures of these applications are incorporated by reference herein in their entirety.

BACKGROUND

Along with development of network technology, an interaction platform for interaction using an instant messaging tool (such as WeChat) emerges. For example, if the instant messaging tool is WeChat, the interaction platform may be, for example, a WeChat wall (or a WeChat large screen) and the like. Specifically, a user may follow a preset account to join an on-site activity through WeChat, and send a message or a picture through WeChat for displaying on the WeChat wall (or the WeChat large screen) to achieve a multiuser interaction effect. In the on-site activity of the WeChat wall (or the WeChat large screen), a prize may be drawn or a participant participating in an activity may be selected by "WeChat shake" (for example, after a shake function of a WeChat tool in a mobile phone is activated, the user holds and shakes the mobile phone). A WeChat user shaking his/her mobile phone or clicking a key to simulate shaking of the mobile phone may be matched, through "WeChat shake", with another WeChat user shaking a mobile phone at the same time. However, such a manner may match no WeChat user sometimes, or a matched WeChat user may be thousands of miles away. Therefore, the manner may not be well applied to an application scenario of an on-site activity, and is unfavorable for user experiences.

SUMMARY

The disclosure relates to information processing technology, and more particularly to an information processing method, a terminal and a non-transitory computer storage medium.

Embodiments of the disclosure provide an information processing method, a terminal and a non-transitory computer storage medium, which may solve the problem that a user may not be well matched in a multimedia interaction platform and may improve user experiences.

The technical solutions of the embodiments of the disclosure are implemented as follows.

An embodiment of the disclosure provides an information processing method, which may include:

identification information is generated according to a preset manner, and the identification information is displayed on a multimedia interaction interface, the identification information being capable of being scanned by clients so that the clients establish an association relationship with a first event presented on the multimedia interaction interface;

identifiers of the clients in the association relationship with the first event are obtained on the basis of results of the clients' scanning of the identification information, and a first set of identifiers is established;

when a condition is met, requests from M clients are received, and identifiers of the M clients are identified;

the identifiers of the M clients are screened on the basis of the first set of identifiers to obtain N client identifiers matched with any identifier in the first set of identifiers, wherein M and N may both be positive integers, and N may be less than or equal to M; and at least one client identifier of the N client identifiers is output according to a preset rule.

As an implementation, before the step that the requests from the M clients are received, the method may further include: information of at least one first subevent is set in the first event, the information of the first subevent including an identifier of the first subevent; and the step that the requests from the M clients are received when the condition is met may include:

when an instruction for triggering the first subevent of the first event is detected, the requests from the M clients are received, wherein the first subevent may be an event requiring to receive requests from the clients.

As an implementation, the information of the first subevent may further include a time parameter, and the step that the requests from the M clients are received may include:

a first instruction is generated and executed for enabling a timer and starting receiving the requests from the clients; and when a time set by the timer on the basis of the time parameter elapses, a second instruction is generated and executed for stopping receiving the requests from the clients.

As an implementation, before the step that the identification information is generated according to the preset manner, the method may further include:

information of the first event is set; and the step that the identification information is generated according to the preset manner may include:

the identification information is generated on the basis of the information of the first event.

As an implementation, the step that the at least one client identifier of the N client identifiers is output according to the preset rule may include:

at least one client identifier is obtained from among the N client identifiers on the basis of a preset algorithm, and the at least one client identifier is displayed.

An embodiment of the disclosure further provides a terminal, which may include: a generation unit, a display unit, a processing unit and a communication unit, the generation unit may be arranged to generate identification information according to a preset manner, the identification information being capable of being scanned by clients so that the clients establish an association relationship with a first event presented on a multimedia interaction interface;

the display unit may be arranged to display, on the multimedia interaction interface, the identification information generated by the generation unit;

the processing unit may be arranged to obtain identifiers of the clients in the association relationship with the first event on the basis of results of the clients' scanning of the identification information generated by the generation unit, and establish a first set of identifiers, may also be arranged to, when a condition is met, enable the communication unit, and may further be arranged to screen, on the basis of the first set of identifiers, identifiers of the M clients identified by the communication unit to obtain N client identifiers matched with any identifier in the first set of identifiers, wherein M and N may both be positive integers, and N may be less than or equal to M;

the communication unit may be arranged to receive requests from M clients, and identify the identifiers of the M clients; and the display unit may further be arranged to output at least one client identifier of the N client identifiers according to a preset rule.

As an implementation, the terminal may further include a setting unit; and the setting unit may be arranged to set, in the first event, information of at least one first subevent, the information of the first subevent including an identifier of the first subevent and a time parameter, wherein a first subevent may be an event requiring to receive requests from the clients; and the processing unit may be arranged to, when an instruction for triggering the first subevent of the first event is detected, enable the communication unit to receive the requests from the M clients on the basis of the time parameter set by the setting unit.

As an implementation, the terminal may further include a timing unit; and the processing unit may be arranged to generate and execute a first instruction for enabling the timing unit and enabling the communication unit to start receiving the requests from the clients, and may further be arranged to, when a time set by the timing unit on the basis of the time parameter elapses, generate and execute a second instruction for enabling the communication unit to stop receiving the requests from the clients.

As an implementation, the terminal may further include a setting unit arranged to set information of the first event; and correspondingly, the generation unit may be arranged to generate the identification information on the basis of the information of the first event set by the setting unit.

As an implementation, the processing unit may be arranged to obtain at least one client identifier from among the N client identifiers on the basis of a preset algorithm; and the display unit may further be arranged to display the at least one client identifier.

An embodiment of the disclosure further provides a non-transitory computer storage medium having stored therein computer-executable instructions arranged to execute the information processing method of the embodiment of the disclosure.

According to the information processing method, terminal and non-transitory computer storage medium provided by the embodiments of the disclosure, the identification information is generated according to the preset manner, and the identification information is displayed on the multimedia interaction interface; the identification information is capable of being scanned by clients so that the clients establish the association relationship with the first event presented on the multimedia interaction interface; identifiers of the clients in the association relationship with the first event are obtained on the basis of the results of the clients' scanning of the identification information, and the first set of identifiers is established; when the condition is met, the requests from the M clients are received, and the identifiers of the M clients are identified; the identifiers of the M clients are screened on the basis of the first set of identifiers to obtain the N client identifiers matched with any identifier in the first set of identifiers, wherein M and N are both positive integers, and N is less than or equal to M; and the at least one client identifier of the N client identifiers is output according to the preset rule. In this way, with adoption of the technical solutions of the embodiments of the disclosure, space-based user matching is implemented in an application scenario of a multimedia interaction platform, that is, user matching is performed for a group of users currently associated with the multimedia interaction platform, the problem that a user may not be well matched in the multimedia interaction platform is solved, interaction smoothness and stability are ensured, and user experiences are greatly improved.

DETAILED DESCRIPTION

The disclosure will be further described below with reference to the drawings and specific embodiments in detail.

Embodiment 1

Figure 1:
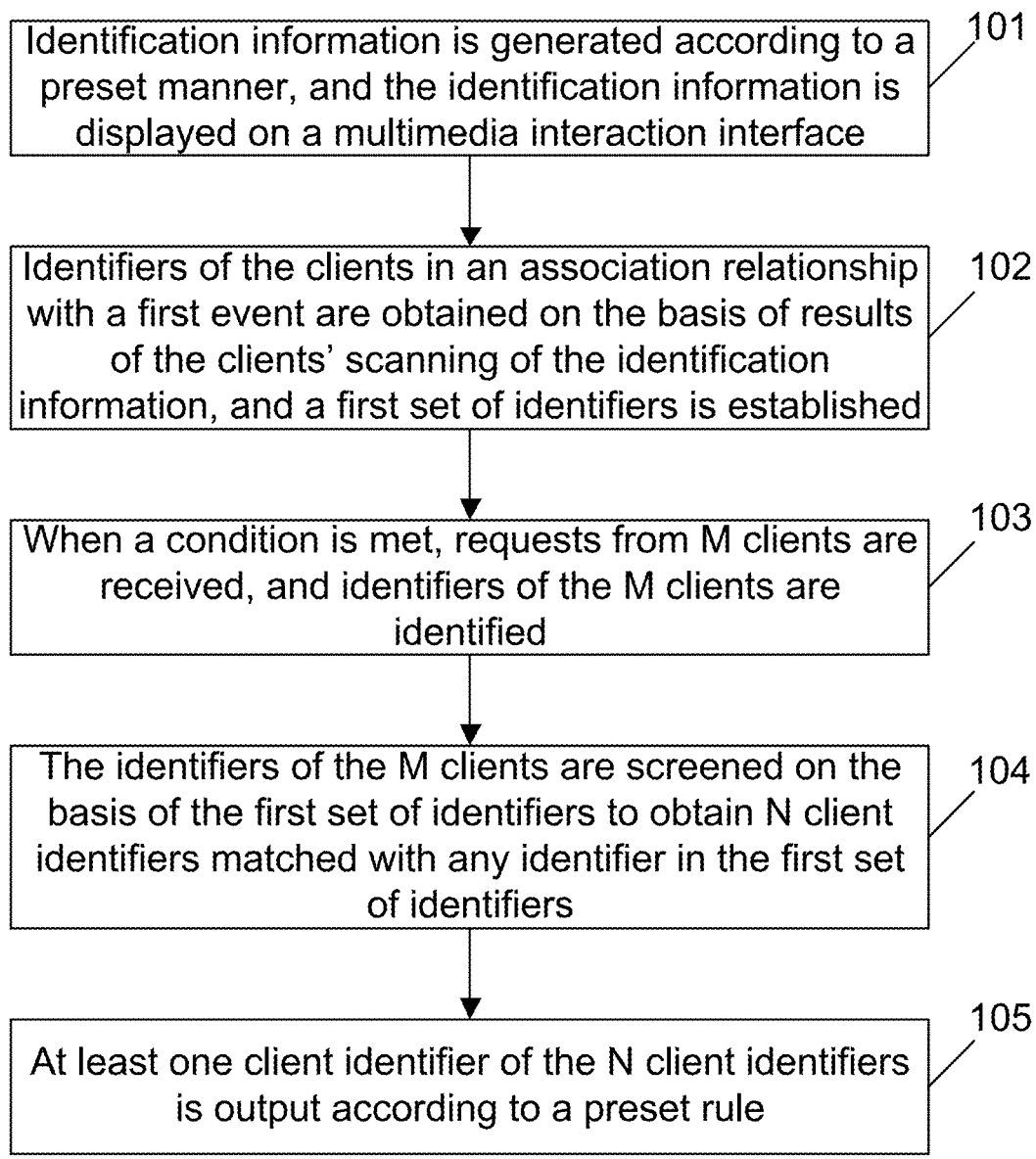
FIG. 1 is a flowchart of an information processing method according to embodiment 1 of the disclosure.

Embodiment 1 of the disclosure provides an information processing method. FIG. 1 is a flowchart of an information processing method according to embodiment 1 of the disclosure. As shown in FIG. 1, the information processing method includes the following steps.

Step 101: identification information is generated according to a preset manner, and the identification information is displayed on a multimedia interaction interface, the identification information being capable of being scanned by clients so that the clients establish an association relationship with a first event presented on the multimedia interaction interface.

The information processing method of the embodiment is applied to a terminal, a multimedia interaction platform may be run in the terminal, and the multimedia interaction interface is presented on a display screen of the terminal. The multimedia interaction platform is, for example, a WeChat wall (or a WeChat large screen). A user may scan a two-dimensional code to follow a preset account to join a first event in the WeChat wall (or the WeChat large screen) through a WeChat scanning tool, and the first event is specifically a certain on-site activity, such as a gathering party activity like gathering party prize drawing, presented on the multimedia interaction interface.

Here, the identification information represents associated account information of the first event, and may specifically be represented by information such as an account and a two-dimensional code. In the embodiment, two-dimensional code information is adopted as the identification information for description.

In the step, before the identification information is generated according to the preset manner, the method further includes that: information of the first event is set; and the step that the identification information is generated according to the preset manner includes that: the identification information is generated on the basis of the information of the first event.

Specifically, the information of the first event may specifically be an identifier of the first event, such as a text identifier or a logo identifier. The operation that the identification information is generated on the basis of the identifier of the first event refers to that the two-dimensional code information is generated on the basis of the identifier of the first event; and the identification information is identification information exclusive to the first event.

The terminal is provided with a display unit, such as the display screen. The identification information is displayed through the display unit of the terminal, and then users may scan the identification information through scanning tools of clients, thereby establishing the association relationship between the clients and the multimedia interaction interface. It should be understood that the users scan the two-dimensional code information to follow the first event on the multimedia interaction interface through the scanning tools of the clients; and furthermore, the users may send text information, picture information or the like through the clients, and the text information or the picture information may be displayed on the multimedia interaction interface to achieve a purpose of improving interactivity of multiple users.

Step 102: identifiers of the clients in the association relationship with the first event are obtained on the basis of results of the clients' scanning of the identification information, and a first set of identifiers is established.

In the step, the users may scan the identification information through the scanning tools of the clients, thereby establishing the association relationship between the clients and the multimedia interaction interface. That is, the users scan the two-dimensional code information to follow the first event on the multimedia interaction interface through the scanning tools of the clients. The terminal may acquire the results of the clients' scanning of the identification information, i.e. association results of the clients with respect to the first event on the multimedia interaction interface, to obtain all the client identifiers establishing the association relationship with the multimedia interaction interface, which may be understood that a user list following the first event on the multimedia interaction interface is obtained, and establish the first set of identifiers including all the client identifiers establishing the association relationship with the multimedia interaction interface. Wherein, for example, the clients are WeChat application clients, and the client identifiers may include identification information which may uniquely represent the users such as WeChat usernames, WeChat user numbers or WeChat user two-dimensional code cards.

Step 103: when a condition is met, requests from M clients are received, and identifiers of the M clients are identified.

Here, the step that the requests from the M clients are received when the condition is met includes that: when an instruction for triggering the first subevent of the first event is detected, the requests from the M clients are received, wherein the first subevent is an event requiring to receive requests from the clients.

Wherein, before the requests from the M clients are received, the method further includes that: information of at least one first subevent is set in the first event, the information of the first subevent including an identifier of the first subevent.

In the embodiment, a parameter setting function is preset on the multimedia interaction interface, and the parameter setting function may set parameter information for the event requiring to receive the requests from the clients, wherein the event requiring to receive the requests from the clients may be a "shake" event in the WeChat clients; and when the WeChat clients enable a "shake" function and the users hold terminals such as mobile phones and start shaking, the WeChat clients send the requests to a server side. In the embodiment, when the users hold the terminals such as the mobile phones and start shaking, the WeChat clients send the requests to the terminal where the multimedia interaction platform is located. However, the requests, received by the terminal, of the clients are the requests from the clients of the mobile phones which are shaken at a current moment, and it may be understood that the terminal may receive the requests from all the clients within communication coverage of the terminal, that is, the terminal may receive requests from clients which do not establish the association relationship with the multimedia interaction interface.

Specifically, the multimedia interaction platform may set at least one first subevent for the first event. For example, when the first event is a gathering party activity, the first subevent may be a subevent such as gathering party prize drawing and selection of employees for participating in a game. The parameter setting function on the multimedia interaction interface may set a parameter for each first subevent, and the parameter include the identifier of the first subevent and the like; and the identifier of the first subevent may be a subevent name.

Furthermore, in the implementation, the information of the first subevent further includes a time parameter, and the step that the requests from the M clients are received includes that: a first instruction is generated and executed for enabling a timer and starting receiving the requests from the clients; and when a time set by the timer on the basis of the time parameter elapses, a second instruction is generated and executed for stopping receiving requests from the clients, wherein the time parameter represents a duration of the subevent.

Step 104: the identifiers of the M clients are screened on the basis of the first set of identifiers to obtain N client identifiers matched with any identifier in the first set of identifiers, wherein M and N are both positive integers, and N is less than or equal to M.

Here, since the terminal may receive the requests from the clients which do not establish the association relationship with the multimedia interaction interface, on such a basis, the terminal screens the identifiers of the M clients identified from the received requests from the clients to obtain the N client identifiers matched with any identifier in the first set of identifiers, that is, the client identifiers which establish the association relationship with the multimedia interaction interface are obtained.

Step 105: at least one client identifier of the N client identifiers is output according to a preset rule.

In the step, the step that the at least one client identifier of the N client identifiers is output according to the preset rule includes that: at least one client identifier is obtained from among the N client identifiers on the basis of a preset algorithm, and the at least one client identifier is displayed.

Specifically, under a limit of a specific application scenario of the first event, when the first event is a gathering party activity and the first subevent is gathering party prize drawing, there are usually a large number of participant users but a small number of winning users. Under such a condition, the terminal selects a preset number of client identifiers for displaying from the N client identifiers. The preset number may also be set in the parameter setting function on the multimedia interaction interface, wherein the preset algorithm may be any random selection algorithm in a conventional art, and there are no more descriptions made in the embodiment.

With adoption of the technical solution of the embodiment of the disclosure, space-based user matching is implemented in an application scenario of the multimedia interaction platform, that is, user matching is performed for a group of users currently associated with the multimedia interaction platform, the problem that a user may not be well matched in the multimedia interaction platform is solved, interaction smoothness and stability are ensured, and user experiences are greatly improved.

The embodiment of the disclosure further provides a non-transitory computer storage medium having stored therein computer-executable instructions arranged to execute the information processing method of the embodiment of the disclosure.

Embodiment 2

Figure 2:
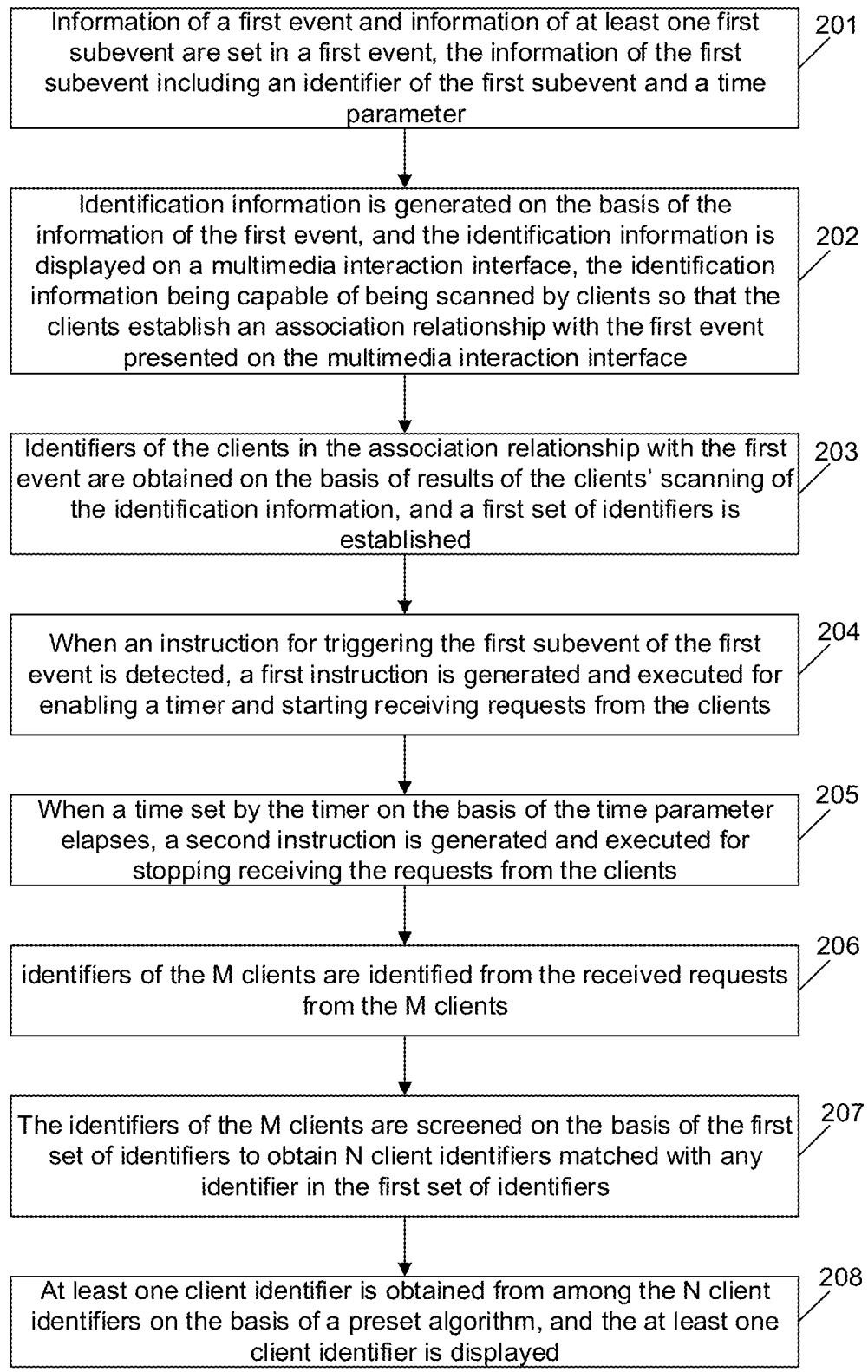
FIG. 2 is a flowchart of an information processing method according to embodiment 2 of the disclosure.

The embodiment of the disclosure further provides an information processing method. FIG. 2 is a flowchart of an information processing method according to embodiment 2 of the disclosure. As shown in FIG. 2, the method includes the following steps.

Step 201: information of the first event and information of at least one first subevent are set in a first event, the information of the first subevent including an identifier of the first subevent and a time parameter, wherein a first subevent is an event requiring to receive requests from clients.

The information processing method of the embodiment is applied to a terminal, a multimedia interaction platform may be run in the terminal, and a multimedia interaction interface is presented on a display screen of the terminal. The multimedia interaction platform is, for example, a WeChat wall (or a WeChat large screen). A user may scan a two-dimensional code to follow a preset account to join the first event in the WeChat wall (or the WeChat large screen) through a WeChat scanning tool, and the first event is specifically a certain on-site activity, such as a gathering party activity like gathering party prize drawing, presented on the multimedia interaction interface.

In the embodiment, a parameter setting function is preset on the multimedia interaction interface, and the parameter setting function may set parameter information for the event requiring to receive the requests from the clients. The parameter setting function may be realized by a preset function key.

Specifically, the information of the first event may specifically be an identifier of the first event, such as a text identifier or a logo identifier. The first subevent is an event requiring to receive the requests from the clients, and specifically, the event requiring to receive the requests from the clients may be a "shake" event in WeChat clients, such as "shake" to draw a prize and "shake" to participate in a game, wherein the identifier of the first subevent may be a subevent name, and the time parameter represents a duration of the subevent.

Step 202: identification information is generated on the basis of the information of the first event, and the identification information is displayed on a multimedia interaction interface, the identification information being capable of being scanned by clients so that the clients establish an association relationship with the first event presented on the multimedia interaction interface.

Here, the identification information represents associated account information of the first event, and may specifically be represented by information such as an account and a two-dimensional code. The operation that the identification information is generated on the basis of the information of the first event refers to that the identification information is generated on the basis of an identifier of the first event, that is, two-dimensional code information is generated on the basis of the identifier of the first event. In the embodiment, the two-dimensional code information is adopted as the identification information for description.

In the embodiment, the terminal is provided with a display unit, such as the display screen. The identification information is displayed through the display unit of the terminal, and then users may scan the identification information through scanning tools of clients, thereby establishing the association relationship between the clients and the multimedia interaction interface. It should be understood that the users scan the two-dimensional code information to follow the first event on the multimedia interaction interface through the scanning tools of the clients; and furthermore, the users may send text information, picture information or the like through the clients, and the text information or the picture information may be displayed on the multimedia interaction interface to achieve a purpose of improving interactivity of multiple users.

Step 203: identifiers of the clients in the association relationship with the first event are obtained on the basis of results of the clients' scanning of the identification information, and a first set of identifiers is established.

In the step, the users may scan the identification information through the scanning tools of the clients, thereby establishing the association relationship between the clients and the multimedia interaction interface. That is, the users scan the two-dimensional code information to follow the first event on the multimedia interaction interface through the scanning tools of the clients. The terminal may acquire the results of the clients' scanning of the identification information, i.e. association results of the clients with respect to the first event on the multimedia interaction interface, to obtain all the client identifiers establishing the association relationship with the multimedia interaction interface, which may be understood that a user list following the first event on the multimedia interaction interface is obtained, and establish the first set of identifiers including all the client identifiers establishing the association relationship with the multimedia interaction interface. Wherein, for example, the clients are WeChat application clients, and the client identifiers may include identification information which may uniquely represent the users such as WeChat usernames, WeChat user numbers or WeChat user two-dimensional code cards.

Step 204: when an instruction for triggering the first subevent of the first event is detected, a first instruction is generated and executed for enabling a timer and starting receiving the requests from the clients.

In the embodiment, the instruction for triggering the first subevent may be triggered by a manual operation of an operator.

Step 205: when a time set by the timer on the basis of the time parameter elapses, a second instruction is generated and executed for stopping receiving requests from the clients.

In the embodiment, in the multimedia interaction platform, each subevent corresponds to a time parameter, that is, a timer is set for each subevent. When the instruction for triggering the first subevent is detected, the first instruction is generated and executed for enabling a timer corresponding to the first subevent and starting receiving the request messages from the clients. Correspondingly, when the time set by the timer elapses, the second instruction is generated and executed for stopping receiving the requests from the clients. In a period from starting of reception of the requests sent by the clients to stopping of reception of the requests from the clients, the terminal receives the requests from M clients. However, the requests, received by the terminal, of the clients are requests from clients of mobile phones which are shaken at a current moment, and it may be understood that the terminal may receive the requests from all the clients within communication coverage of the terminal, that is, the terminal may receive requests from clients which do not establish the association relationship with the multimedia interaction interface.

Step 206: identifiers of the M clients are identified from the received requests from the M clients.

Step 207: the identifiers of the M clients are screened on the basis of the first set of identifiers to obtain N client identifiers matched with any identifier in the first set of identifiers, wherein M and N are both positive integers, and N is less than or equal to M.

Here, since the terminal may receive the requests from the clients which do not establish the association relationship with the multimedia interaction interface, on such a basis, the terminal screens the identifiers of the M clients identified from the received requests from the clients to obtain the N client identifiers matched with any identifier in the first set of identifiers, that is, the client identifiers which establish the association relationship with the multimedia interaction interface are obtained.

Step 208: at least one client identifier is obtained from among the N client identifiers on the basis of a preset algorithm, and the at least one client identifier is displayed.

In the step, the operation that at least one client identifier of the N client identifiers is output according to a preset rule includes that: the at least one client identifier is obtained from among the N client identifiers on the basis of the preset algorithm, and the at least one client identifier is displayed.

Specifically, under a limit of a specific application scenario of the first event, when the first event is a gathering party activity and the first subevent is gathering party prize drawing, there are usually a large number of participant users but a small number of winning users. Under such a condition, the terminal selects a preset number of client identifiers for displaying from the N client identifiers. The preset number may also be set in the parameter setting function on the multimedia interaction interface, wherein the preset algorithm may be any random selection algorithm in the conventional art, and there are no more descriptions made in the embodiment.

With adoption of the technical solution of the embodiment of the disclosure, space-based user matching is implemented in an application scenario of the multimedia interaction platform, that is, user matching is performed for a group of users currently associated with the multimedia interaction platform, the problem that a user may not be well matched in the multimedia interaction platform is solved, interaction smoothness and stability are ensured, and user experiences are greatly improved.

The embodiment of the disclosure further provides a non-transitory computer storage medium having stored therein computer-executable instructions arranged to execute the information processing method of the embodiment of the disclosure.

Embodiment 3

Figure 3:
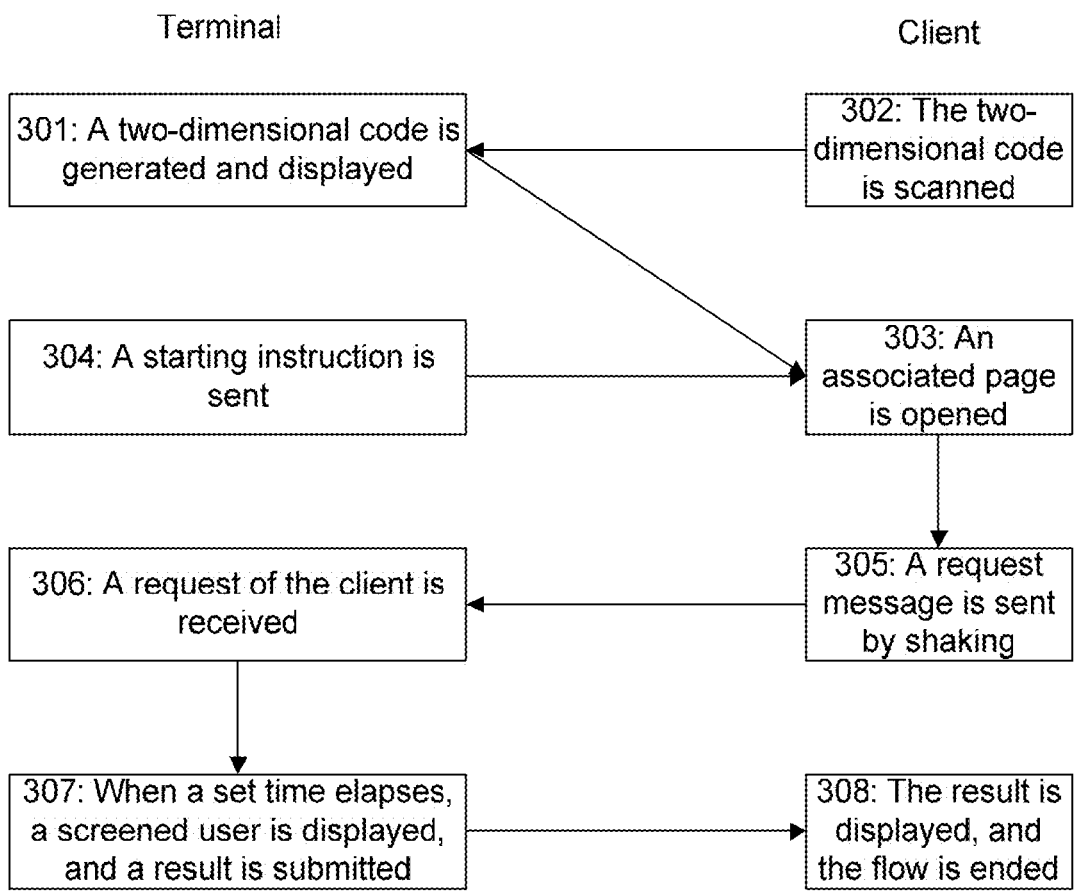
FIG. 3 is an interaction diagram of an information processing method according to embodiment 3 of the disclosure.

Further to embodiments 1 and 2, embodiment 3 further provides an information processing method. In the embodiment, descriptions are made with the condition that a multimedia interaction platform is a WeChat wall and a first event is an on-site activity as an example. FIG. 3 is an interaction diagram of an information processing method according to embodiment 3 of the disclosure. As shown in FIG. 3, the method includes the following steps.

Step 301: a terminal generates and displays a two-dimensional code.

Figure 4:
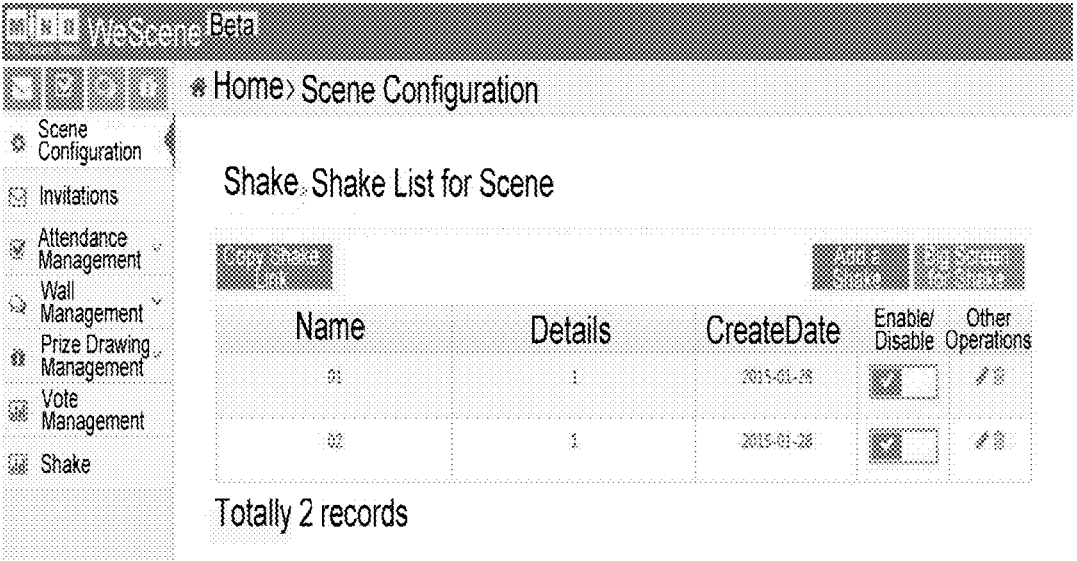
FIG. 4 is a schematic diagram of an area setting scenario according to embodiment 3 of the disclosure.

Here, before the terminal generates and displays the two-dimensional code, a parameter required by the on-site activity is set through a setting function in the WeChat wall. FIG. 4 is a schematic diagram of an area setting scenario according to embodiment 3 of the disclosure. As shown in FIG. 4, in a WeChat setting process of the on-site activity, a function key is prearranged, such as a "add a shake" function key, and a user may click the "add a shake" function key to perform parameter setting on each subevent requiring "shake".

Figure 5:
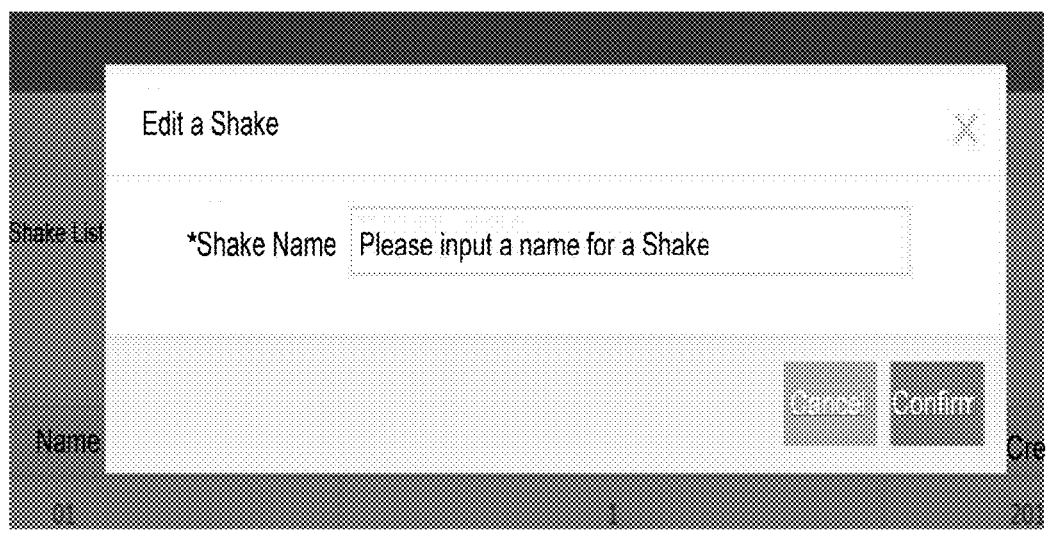
FIG. 5 is a schematic diagram of a subevent setting scenario according to embodiment 3 of the disclosure.

FIG. 5 is a schematic diagram of a subevent setting scenario according to embodiment 3 of the disclosure. As shown in FIG. 5, after the "add a shake" function key is triggered to be clicked, an edit box is generated and displayed, and the user may input a name of the subevent into the edit box, such as prize drawing or gaming.

Figure 6:
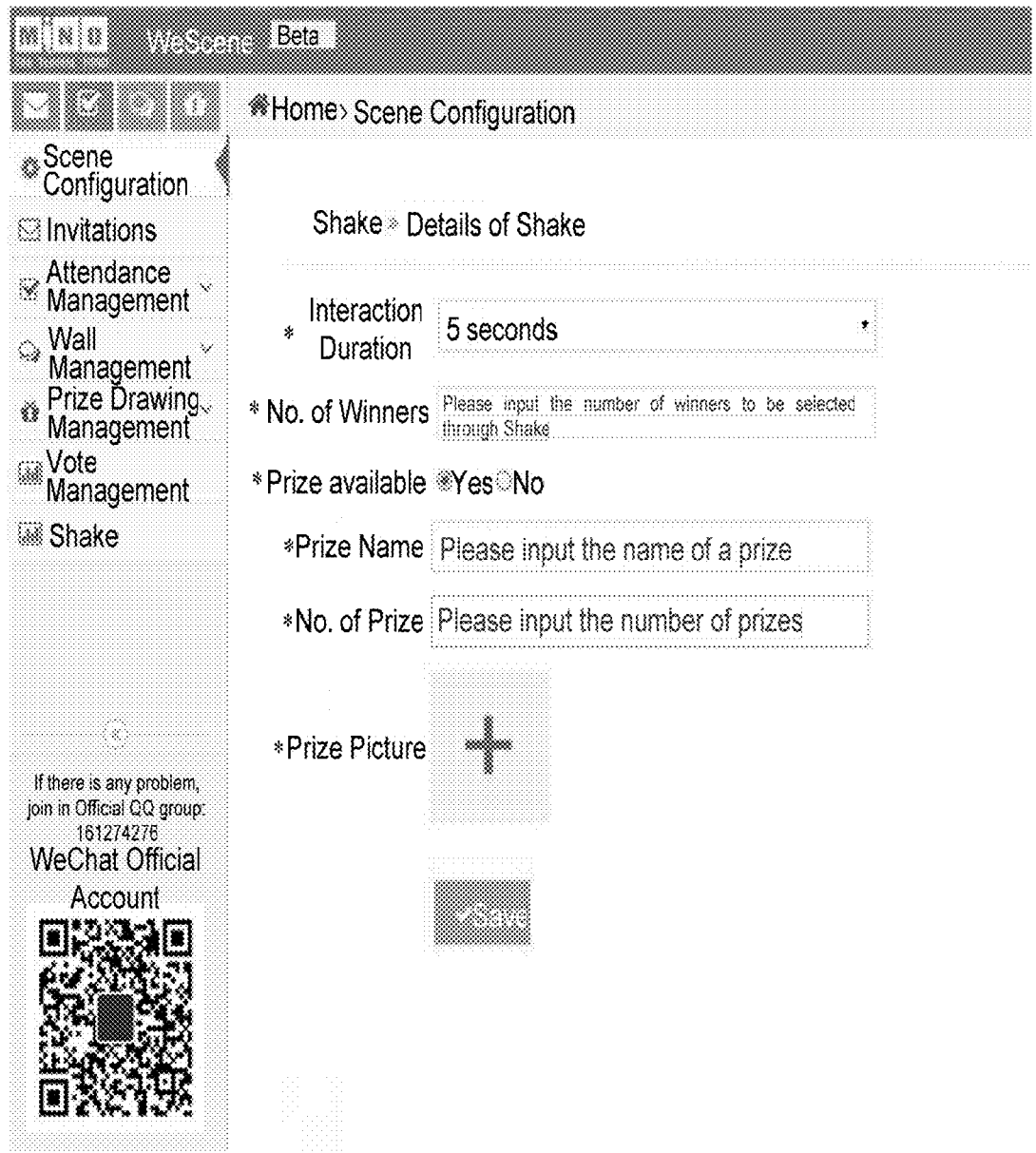
FIG. 6 is a schematic diagram of a setting scenario of a parameter corresponding to a subevent according to embodiment 3 of the disclosure.

FIG. 6 is a schematic diagram of a setting scenario of a parameter corresponding to a subevent according to embodiment 3 of the disclosure. As shown in FIG. 6, after the edit box shown in FIG. 5 is determined to be completed, a parameter configuration area is generated for the "shake" subevent, wherein a time parameter, a user number parameter and the like are included, and the user may set a duration of the "shake" subevent, a number of users selected in a "shake" manner and the like in the parameter configuration area. Furthermore, when the subevent is a prize drawing event, prize information, including a prize name, a prize number, a prize picture and the like, may further be set through the parameter configuration area.

After setting of the parameters is completed, the terminal generates identification information on the basis of an identifier of the on-site activity, specifically generates two-dimensional code information, and displays it through a display screen of the terminal. Users may scan the two-dimensional code information to follow the on-site activity presented in the WeChat wall through scanning tools of clients.

Step 302: clients scan the two-dimensional code.

Here, the clients scan the two-dimensional code to obtain a link address of the on-site activity presented in the WeChat wall.

Step 303: the clients open an associated page.

Here, the clients open the page of the on-site activity through a WebSocket communication protocol on the basis of the link address obtained by scanning the two-dimensional code.

In the embodiment, the terminal may acquire results of the clients' scanning of the two-dimensional code to obtain all client identifiers establishing an association relationship with the on-site activity, which may be understood that all the client identifiers following the on-site activity are obtained, and generate an set of identifiers. The client identifiers may specifically be client names, such as WeChat names; and the set of identifiers is a WeChat name set.

Step 304: the terminal sends an activity starting instruction.

Figure 7:
FIG. 7 is a schematic diagram of an application scenario of a terminal according to embodiment 3 of the disclosure.

In the scenario, the on-site activity may include a subevent such as prize drawing and gaming. When any subevent is started, a worker of the terminal may generate the activity starting instruction by triggering an activity starting key, and send the activity starting instruction. FIG. 7 is a schematic diagram of an application scenario of a terminal according to embodiment 3 of the disclosure. In the schematic diagram, for example, for the prize drawing subevent, after the terminal sends the activity starting instruction, countdown shown in FIG. 7 is triggered to be started, and an initial time in the countdown is the time parameter corresponding to the subevent set in Step 301.

Step 305: the clients shake to send request messages.

Step 306: the terminal receives the request messages of the clients.

Figure 8A:
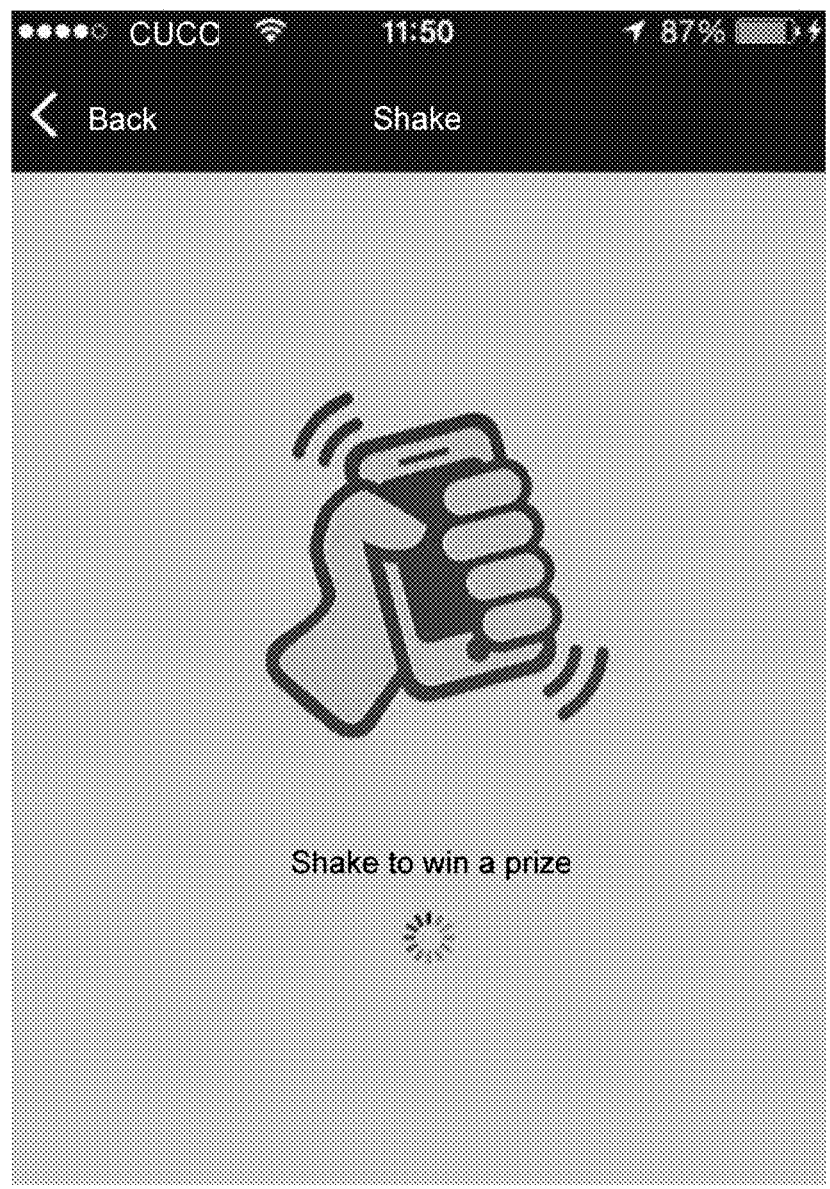
FIG. 8A is a schematic diagram of a first application scenario of a client according to embodiment 3 of the disclosure.
Figure 8B:
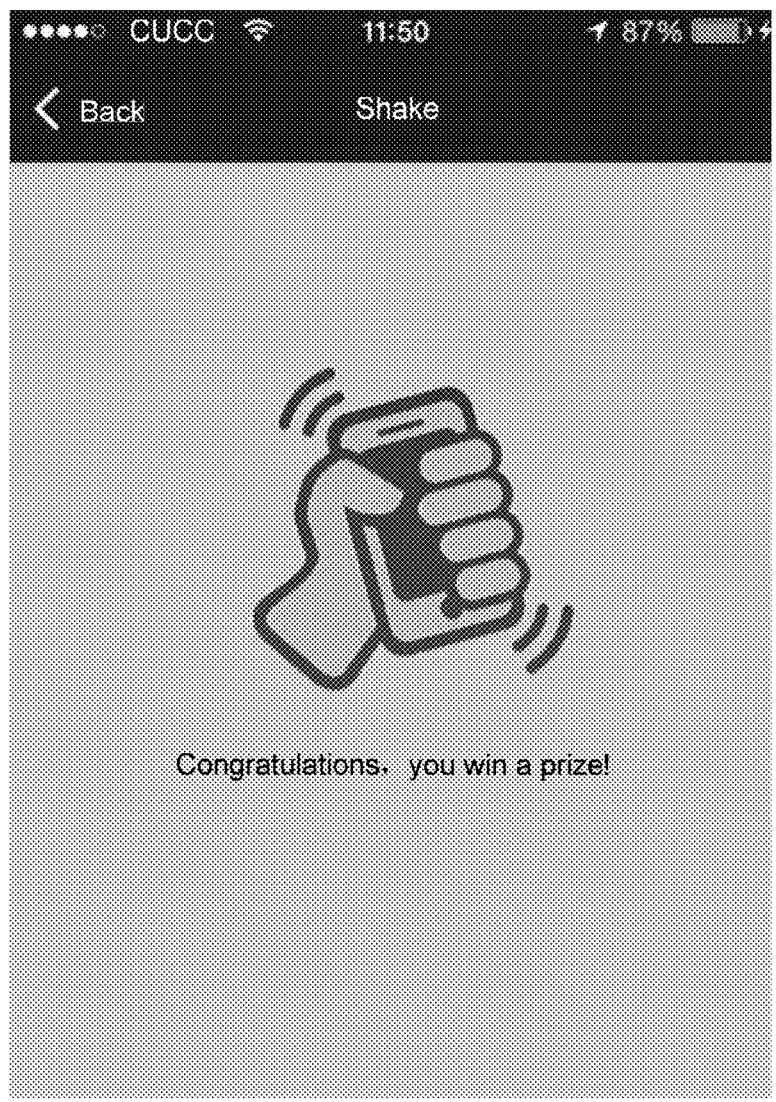
FIG. 8B is a schematic diagram of a second application scenario of a client according to embodiment 3 of the disclosure.
Figure 8C:
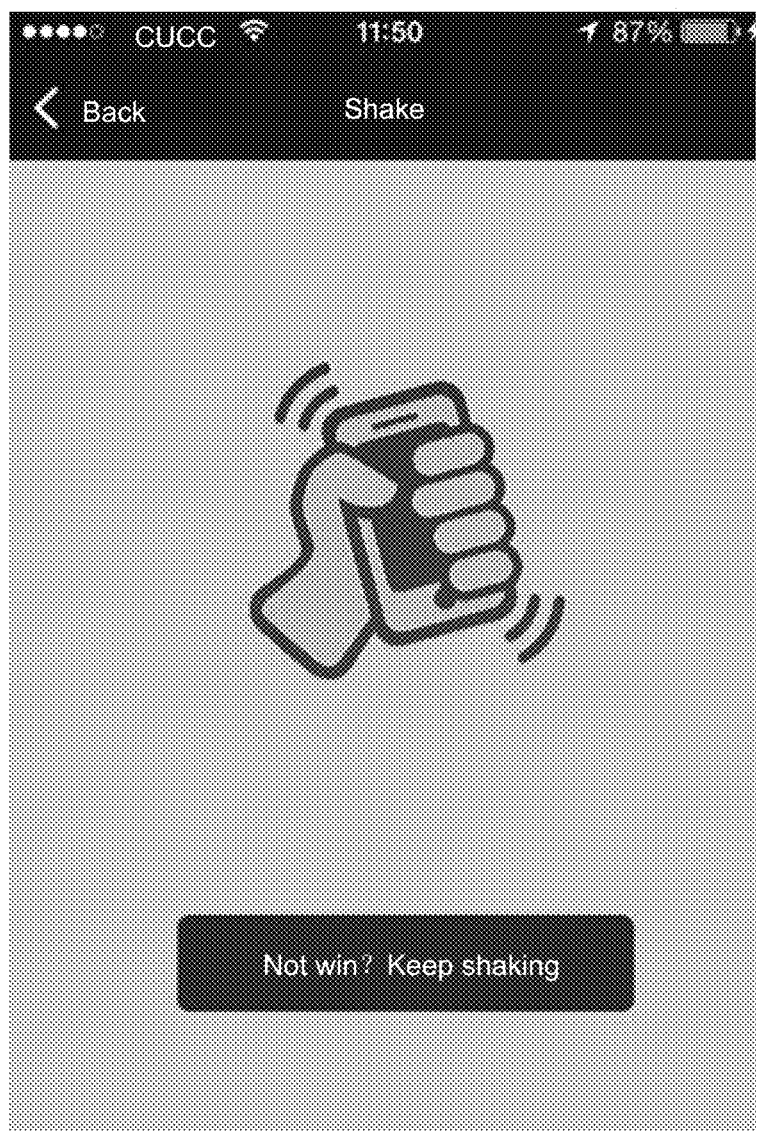
FIG. 8C is a schematic diagram of a third application scenario of a client according to embodiment 3 of the disclosure.

In the step, FIGS. 8A, 8B, and 8C are schematic diagrams of an application scenario of a client according to embodiment 3 of the disclosure. As shown in FIG. 8A, when the terminal sends the activity starting instruction, the users may shake mobile phones, and at initial shaking moments, the clients send the request messages to the terminal. Furthermore, the terminal sends acknowledgement response messages to the clients after receiving the request messages of the clients, and the clients display acknowledgement messages representing succeeds shown in FIG. 8B. When the terminals do not receive the request messages of the clients or the received request messages are abnormal, the clients do not receive the acknowledgement messages within a preset time period, the clients display acknowledgement messages representing failures shown in FIG. 8C.

Step 307: when a set time elapses, the terminal stops receiving the request messages of the clients, displays screened users, submits a result, and sends a result to the clients.

Here, when the countdown elapses, the terminal disables a communication channel, and stops receiving the request messages of the clients.

Here, since the terminal may receive requests from clients which do not establish the association relationship with the current on-site activity, on such a basis, the terminal screens the received requests from the clients to obtain client identifiers establishing the association relationship with the current on-site activity. Furthermore, the terminal randomly selects the screened client identifiers by adopting a preset random selection algorithm, and determines finally selected client identifiers on the basis of the user number parameter corresponding to the subevent set in Step 301. As shown in FIG. 7, if the user number parameter is 6 in the schematic diagram, 6 client identifiers are randomly selected.

Step 308: the clients display the result, and the flow is ended.

With adoption of the technical solution of the embodiment of the disclosure, space-based user matching is implemented in an application scenario of a multimedia interaction platform, that is, user matching is performed for a group of users currently associated with the multimedia interaction platform, the problem that a user may not be well matched in the multimedia interaction platform is solved, interaction smoothness and stability are ensured, and user experiences are greatly improved.

Embodiment 4

Figure 9:
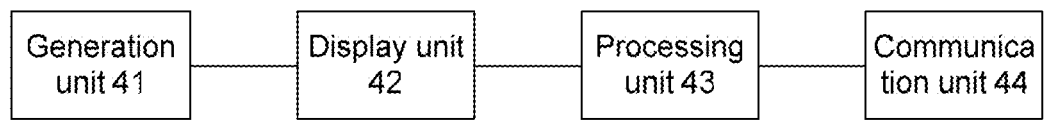
FIG. 9 is a first structure diagram of a terminal according to an embodiment of the disclosure.

The embodiment of the disclosure further provides a terminal. FIG. 9 is a first structure diagram of a terminal according to an embodiment of the disclosure. As shown in FIG. 9, the terminal includes: a generation unit 41, a display unit 42, a processing unit 43 and a communication unit 44, wherein the generation unit 41 is arranged to generate identification information according to a preset manner, the identification information being capable of being scanned by clients so that the clients establish an association relationship with a first event presented on a multimedia interaction interface;

the display unit 42 is arranged to display, on the multimedia interaction interface, the identification information generated by the generation unit;

the processing unit 43 is arranged to obtain identifiers of the clients in the association relationship with the first event on the basis of results of the clients' scanning of the identification information generated by the generation unit 42, and establish a first set of identifiers, is also arranged to, when a condition is met, enable the communication unit 44, and is further arranged to screen, on the basis of the first set of identifiers, identifiers of the M clients identified by the communication unit 44 to obtain N client identifiers matched with any identifier in the first set of identifiers, wherein M and N are both positive integers, and N is less than or equal to M;

the communication unit 44 is arranged to receive requests from M clients, and identify the identifiers of the M clients; and the display unit 42 is further arranged to output at least one client identifier of the N client identifiers according to a preset rule.

In the embodiment, a multimedia interaction platform may be run in the terminal, and the multimedia interaction interface is presented on the display unit 42. The multimedia interaction platform is, for example, a WeChat wall (or a WeChat large screen). A user may scan a two-dimensional code to follow a preset account to join a first event in the WeChat wall (or the WeChat large screen) through a WeChat scanning tool, and the first event is specifically a certain on-site activity, such as a gathering party activity like gathering party prize drawing, presented on the multimedia interaction interface.

Here, the identification information represents associated account information of the first event, and may specifically be represented by information such as an account and a two-dimensional code. In the embodiment, two-dimensional code information is adopted as the identification information for description.

In the embodiment, the display unit 42 is specifically, for example, a display screen. The identification information is displayed through the display unit 42 of the terminal, and then users may scan the identification information through scanning tools of clients, thereby establishing the association relationship between the clients and the multimedia interaction interface. It should be understood that the users scan the two-dimensional code information to follow the first event on the multimedia interaction interface through the scanning tools of the clients; and furthermore, the users may send text information, picture information or the like through the clients, and the text information or the picture information may be displayed on the multimedia interaction interface to achieve a purpose of improving interactivity of multiple users. Correspondingly, the processing unit 43 may acquire results of the clients' scanning of the identification information, i.e. association results of the clients with respect to the first event on the multimedia interaction interface, to obtain all the client identifiers establishing the association relationship with the multimedia interaction interface, which may be understood that a user list following the first event on the multimedia interaction interface is obtained, and establish the first set of identifiers including all the client identifiers establishing the association relationship with the multimedia interaction interface. Wherein, for example, the clients are WeChat application clients, and the client identifiers may include identification information which may uniquely represent the users such as WeChat usernames, WeChat user numbers or WeChat user two-dimensional code cards.

In the embodiment, the communication unit 44 is arranged to, when an instruction for triggering the first subevent of the first event is detected, receive the requests from the M clients, wherein the first subevent is an event requiring to receive requests from the clients. Wherein, the processing unit 43 is further arranged to, before the communication unit 44 receives the requests from the M clients, set, in the first event, information of at least one first subevent, the information of the first subevent including an identifier of the first subevent.

In the embodiment, a parameter setting function is preset on the multimedia interaction interface, and the parameter setting function may set parameter information for the event requiring to receive the requests from the clients, wherein the event requiring to receive the requests from the clients may be a "shake" event in WeChat clients; and when the WeChat clients enable a "shake" function and the users hold terminals such as mobile phones and start shaking, the WeChat clients send the requests to a server side. In the embodiment, when the users hold the terminals such as the mobile phones and start shaking, the WeChat clients send the requests to the terminal where the multimedia interaction platform is located. However, the requests, received by the terminal, of the clients are the requests from the clients of the mobile phones which are shaken at a current moment, and it may be understood that the terminal may receive the requests from all the clients within communication coverage of the terminal, that is, the terminal may receive requests from clients which do not establish the association relationship with the multimedia interaction interface.

Specifically, the multimedia interaction platform may set at least one first subevent for the first event. For example, when the first event is a gathering party activity, the first subevent may be a subevent such as gathering party prize drawing and selection of employees for participating in a game. The parameter setting function on the multimedia interaction interface may set a parameter for each first subevent, and the parameter include the identifier of the first subevent and the like; and the identifier of the first subevent may be a subevent name.

Furthermore, in the implementation, the information of the first subevent further includes a time parameter, and the operation that the requests from the M clients are received includes that: a first instruction is generated and executed for enabling a timer and starting receiving the requests from the clients; and when a time set by the timer on the basis of the time parameter elapses, a second instruction is generated and executed for stopping receiving requests from the clients, wherein the time parameter represents a duration of the subevent.

In the embodiment, since the terminal may receive the requests from the clients which do not establish the association relationship with the multimedia interaction interface, on such a basis, the processing unit 43 of the terminal screens the identifiers of the M clients identified from the received requests from the clients to obtain the N client identifiers matched with any identifier in the first set of identifiers, that is, the client identifiers which establish the association relationship with the multimedia interaction interface are obtained.

In the embodiment, the processing unit 43 is arranged to obtain at least one client identifier from among the N client identifiers on the basis of a preset algorithm; and the display unit 42 is further arranged to display the at least one client identifier.

Specifically, under a limit of a specific application scenario of the first event, when the first event is a gathering party activity and the first subevent is gathering party prize drawing, there are usually a large number of participant users but a small number of winning users. Under such a condition, the terminal selects a preset number of client identifiers for displaying from the N client identifiers. The preset number may also be set in the parameter setting function on the multimedia interaction interface, wherein the preset algorithm may be any random selection algorithm in the conventional art, and there are no more descriptions made in the embodiment.

Those skilled in the art should know that functions of each processing unit in the terminal of the embodiment of the disclosure may be understood with reference to related descriptions in the abovementioned information processing method, and each processing in the terminal of the embodiment of the disclosure may be implemented by an analogue circuit which realizes the functions of the embodiment of the disclosure, and may also be implemented by running software which executes the functions of the embodiment of the disclosure on an intelligent terminal.

Embodiment 5

Figure 10:
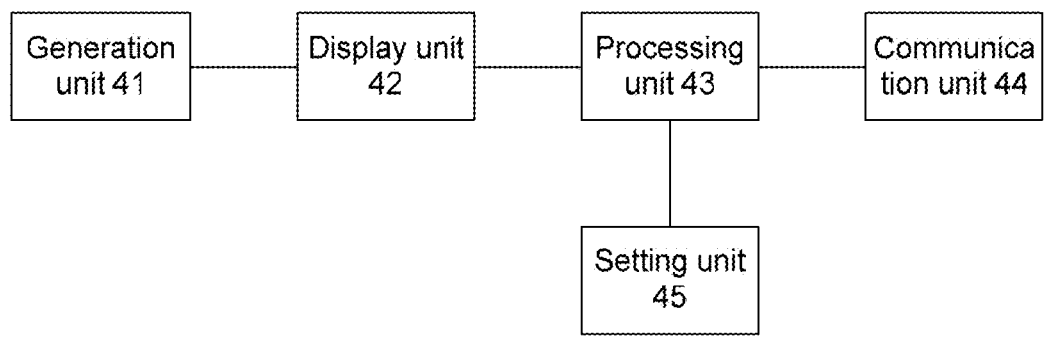
FIG. 10 is a second structure diagram of a terminal according to an embodiment of the disclosure.

Further to embodiment 4, embodiment 5 further provides a terminal. FIG. 10 is a second structure diagram of a terminal according to an embodiment of the disclosure. As shown in FIG. 10, the terminal further includes a setting unit 45; and the setting unit 45 is arranged to set, in the first event, information of at least one first subevent, the information of the first subevent including an identifier of the first subevent and a time parameter, wherein a first subevent is an event requiring to receive requests from the clients.

The processing unit 43 is further arranged to, when an instruction for triggering the first subevent of the first event is detected, enable the communication unit 44 to receive the requests from the M clients on the basis of the time parameter set by the setting unit 45.

In the embodiment, the information of the first event may specifically be an identifier of the first event, such as a text identifier or a logo identifier. The first subevent is an event requiring to receive the requests from the clients, and specifically, the event requiring to receive the requests from the clients may be a "shake" event in WeChat clients, such as "shake" to draw a prize and "shake" to participate in a game, wherein the identifier of the first subevent may be a subevent name, and the time parameter represents a duration of the subevent.

As another implementation, the setting unit 45 is arranged to set information of the first event; and correspondingly, the generation unit 41 is further arranged to generate the identification information on the basis of the information of the first event set by the setting unit 45.

Specifically, the information of the first event may specifically be an identifier of the first event, such as a text identifier or a logo identifier. The operation that the identification information is generated on the basis of the identifier of the first event refers to that the two-dimensional code information is generated on the basis of the identifier of the first event; and the identification information is identification information exclusive to the first event.

Those skilled in the art should know that functions of each processing unit in the terminal of the embodiment of the disclosure may be understood with reference to related descriptions in the abovementioned information processing method, and each processing in the terminal of the embodiment of the disclosure may be implemented by an analogue circuit which realizes the functions of the embodiment of the disclosure, and may also be implemented by running software which executes the functions of the embodiment of the disclosure on an intelligent terminal.

Embodiment 6

Figure 11:
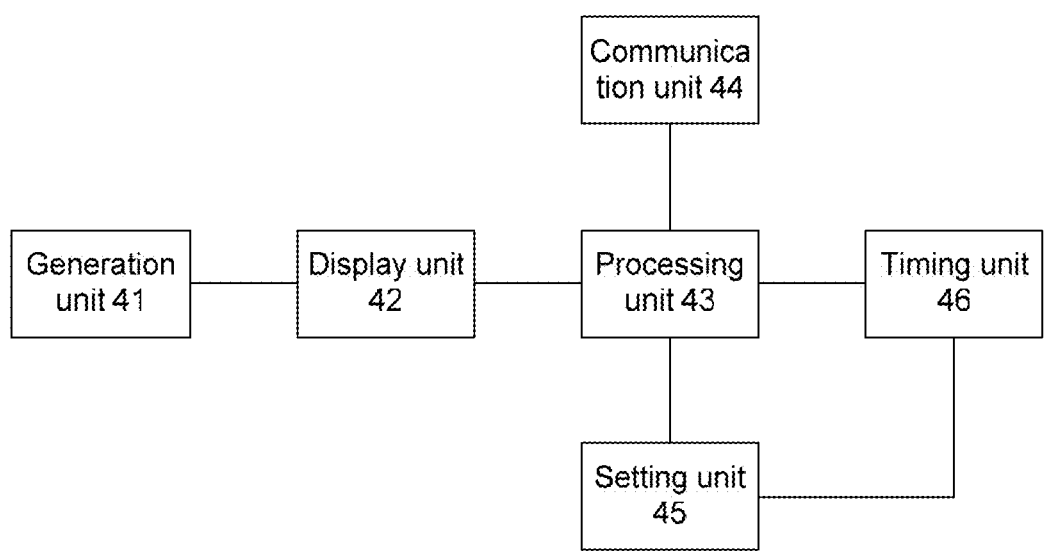
FIG. 11 is a third structure diagram of a terminal according to an embodiment of the disclosure.

Further to embodiment 5, embodiment 6 further provides a terminal. FIG. 11 is a third structure diagram of a terminal according to an embodiment of the disclosure. As shown in FIG. 11, the terminal further includes a timing unit 46; and the processing unit 43 is arranged to generate and execute a first instruction for enabling the timing unit 46 and enabling the communication unit 44 to start receiving the requests from the clients, and is further arranged to, when a time set by the timing unit 46 on the basis of the time parameter elapses, generate and execute a second instruction for enabling the communication unit 44 to stop receiving the requests from the clients.

In the embodiment, in the multimedia interaction platform, each subevent corresponds to a time parameter, that is, a timer is set for each subevent. When the instruction for triggering the first subevent is detected, the processing unit 43 generates and executes the first instruction for enabling a timer corresponding to the first subevent and starting receiving the request messages from the clients. Correspondingly, when the time set by the timer elapses, the processing unit 43 generates and executes the second instruction for stopping receiving the requests from the clients. In a period from starting of reception of the requests sent by the clients to stopping of reception of the requests from the clients, the communication unit 44 receives the requests from M clients.

Those skilled in the art should know that functions of each processing unit in the terminal of the embodiment of the disclosure may be understood with reference to related descriptions in the abovementioned information processing method, and each processing in the terminal of the embodiment of the disclosure may be implemented by an analogue circuit which realizes the functions of the embodiment of the disclosure, and may also be implemented by running software which executes the functions of the embodiment of the disclosure on an intelligent terminal.

In embodiment 4 to embodiment 6 of the disclosure, the generation unit 41, processing unit 43, setting unit 45 and timing unit 46 in the terminal may all be implemented by a Central Processing Unit (CPU), Digital Signal Processor (DSP) or Field-Programmable Gate Array (FPGA) in the terminal during a practical application; and the display unit 42 in the terminal may be implemented by a display screen or display in the terminal during the practical application.

Figure 12:
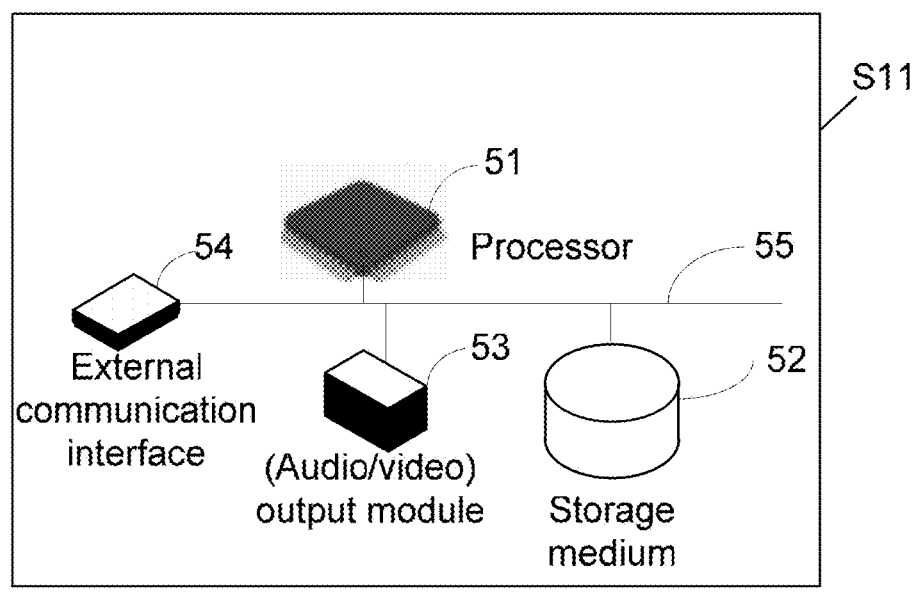
FIG. 12 is a hardware structure diagram of a terminal according to an embodiment of the disclosure.

FIG. 12 is a hardware structure diagram of a terminal according to an embodiment of the disclosure. An example, of serving as a hardware entity S11, of the terminal is shown in FIG. 12, and the terminal includes: a processor 51, a storage medium 52, a display screen 53 and at least one external communication interface 54; and the processor 51, the storage medium 52, the display screen 53 and the external communication interface 54 are all connected through a bus 55.

In some embodiments provided by the disclosure, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the abovementioned storage medium includes: various media capable of storing program codes such as mobile storage equipment, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiment of the disclosure substantially or parts making contributions to the conventional art may be embodied in form of software product, and the computer software product is stored in a storage medium, including a plurality of instructions arranged to enable a piece of computer equipment (which may be a personal computer, a server, network equipment or the like) to execute all or part of the method in each embodiment of the disclosure. The abovementioned storage medium includes: various media capable of storing program codes such as mobile storage equipment, a ROM, a magnetic disk or an optical disk.

The above is only the specific implementation of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be subject to the scope of protection of the claims.

With adoption of the embodiment of the disclosure, space-based user matching is implemented in an application scenario of a multimedia interaction platform, that is, user matching is performed for a group of users currently associated with the multimedia interaction platform, the problem that a user may not be well matched in the multimedia interaction platform is solved, interaction smoothness and stability are ensured, and user experiences are greatly improved.

The invention claimed is:

1. An information processing method, comprising:
generating identification information on an event, the identification information including a two-dimensional code scannable for registration of the event;
displaying the identification information on a multimedia interaction interface of a terminal at a location hosting the event;
receiving scans via the multimedia interface from attending clients present at the location to establish an association relationship with the event, wherein establishing the association relationship with the event comprises joining the event by the attending clients;
obtaining validation identifiers of the attending clients identified via the association relationship;
receiving requests from and identifiers of M clients, the M clients including a first client of the attending clients present at the location and a second client not present at the location;
screening, via the validation identifiers, the identifiers of the M clients to obtain N client identifiers matched with any identifier in the validation identifiers, wherein M and N are both positive integers, N is less than M, and the N clients include the first client and not the second client; and
outputting an identifier of the first client.

2. The method according to claim 1, wherein the attending clients join the event by:
scanning the identification information to follow an account corresponding to the identification information.

3. The method according to claim 1, wherein the event is an on-site activity presented on the multimedia interaction interface.

4. The method according to claim 1, wherein the event includes a first subevent and a second subevent different from the first subevent, the method further comprising:

detecting an instruction for triggering the first subevent; and
receiving requests from the M clients to join the first subevent.

5. The method according to claim 1, wherein generating identification information on the event comprises:
presenting an event set-up interface on the terminal;
activating a shake operation via the event set-up interface;
creating event parameters via an edit box on the event set-up interface, the event parameters including at least one of a name of the event, a number of clients to be selected, and a duration of a shake interaction; and
generating the identification information according to the event parameters.

6. The method according to claim 4, wherein the first subevent includes a time frame the method further comprising:
generating and executing a first instruction for enabling a timer and for starting to receive the requests from the M clients; and
at a time outside of the time frame, generating and executing a second instruction for rejecting the requests from the clients.

7. A terminal, comprising: a memory storing processor-executable instructions; and a processor arranged to execute the stored processor-executable instructions to perform steps of:
generating identification information on an event, the identification information including a two-dimensional code scannable for registration of the event;
displaying the identification information on a multimedia interaction interface of a terminal at a location hosting the event;
receiving scans via the multimedia interface from attending clients present at the location to establish an association relationship with the event, wherein establishing the association relationship with the event comprises joining the event by the attending clients;
obtaining validation identifiers of the attending clients identified via the association relationship;
receiving requests from and identifiers of M clients, the M clients including a first client of the attending clients present at the location and a second client not present at the location;
screening, via the validation identifiers, the identifiers of the M clients to obtain N client identifiers matched with any identifier in the validation identifiers, wherein M and N are both positive integers, N is less than M, and the N clients include the first client and not the second client; and
outputting an identifier of the first client.

8. The terminal according to claim 7, wherein the attending clients join the event by:
scanning the identification information to follow an account corresponding to the identification information.

9. The terminal according to claim 7, wherein the event is an onsite activity presented on the multimedia interaction interface.

10. The terminal according to claim 7, wherein the event includes a first subevent and a second subevent different from the first subevent, and wherein the processor is further configured to perform:
detecting an instruction for triggering the first subevent; and
receiving requests from the M clients to join the first subevent.

11. The terminal according to claim 7, wherein generating identification information on the event comprises:
   presenting an event set-up interface on the terminal;
   activating a shake operation via the event set-up interface;
   creating event parameters via an edit box on the event set-up interface, the event parameters including at least one of a name of the event, a number of clients to be selected, and a duration of a shake interaction; and
   generating the identification information according to the event parameters.

12. The terminal according to claim 10, wherein the first subevent includes a time frame the method further comprising:
   generating and executing a first instruction for enabling a timer and for starting to receive the requests from the M clients; and
   at a time outside of the time frame, generating and executing a second instruction for rejecting the requests from the clients.

13. A non-transitory computer storage medium having stored therein computer-executable instructions arranged to execute an information processing method, the method comprising:
   generating identification information on an event, the identification information including a two-dimensional code scannable for registration of the event;
   displaying the identification information on a multimedia interaction interface of a terminal at a location hosting the event;
   receiving scans via the multimedia interface from attending clients present at the location to establish an association relationship with the event, wherein establishing the association relationship with the event comprises joining the event by the attending clients;
   obtaining validation identifiers of the attending clients identified via the association relationship;
   receiving requests from and identifiers of M clients, the M clients including a first client of the attending clients present at the location and a second client not present at the location;
   screening, via the validation identifiers, the identifiers of the M clients to obtain N client identifiers matched with any identifier in the validation identifiers, wherein M and N are both positive integers, N is less than M, and the N clients include the first client and not the second client; and
   outputting an identifier of the first client.

14. The non-transitory computer storage medium according to claim 13, wherein the attending clients join the event by:
   scanning the identification information to follow an account corresponding to the identification information.

15. The non-transitory computer storage medium according to claim 13, wherein the event includes a first subevent and a second subevent different from the first subevent, and wherein the method further comprises:
   detecting an instruction for triggering the first subevent; and
   receiving requests from the M clients to join the first subevent.

16. The non-transitory computer storage medium according to claim 13, wherein generating identification information on the event comprises:
   presenting an event set-up interface on the terminal;
   activating a shake operation via the event set-up interface;
   creating event parameters via an edit box on the event set-up interface, the event parameters including at least one of a name of the event, a number of clients to be selected, and a duration of a shake interaction; and
   generating the identification information according to the event parameters.

17. The non-transitory computer storage medium according to claim 15, wherein the first subevent includes a time frame the method further comprising:
   generating and executing a first instruction for enabling a timer and for starting to receive the requests from the M clients; and
   at a time outside of the time frame, generating and executing a second instruction for rejecting the requests from the clients.

* * * * *